US009878268B2

(12) United States Patent
Kirk et al.

(10) Patent No.: US 9,878,268 B2
(45) Date of Patent: Jan. 30, 2018

(54) PHASE SEPARATION TANK

(71) Applicant: EXTERRAN WATER SOLUTIONS ULC, Calgary (CA)

(72) Inventors: Todd William Kirk, Rockyview County (CA); Daniel Clifford Whitney, Cochrane (CA); Douglas Walker Lee, Calgary (CA)

(73) Assignee: EXTERRAN WATER SOLUTIONS ULC, Calgary, Alberta (CA)

( * ) Notice: Subject to any disclaimer, the term of this patent is extended or adjusted under 35 U.S.C. 154(b) by 638 days.

(21) Appl. No.: 14/479,429

(22) Filed: Sep. 8, 2014

(65) Prior Publication Data
US 2016/0038855 A1   Feb. 11, 2016

(30) Foreign Application Priority Data
Aug. 11, 2014 (CA) .................... 02859028

(51) Int. Cl.
*C02F 1/24* (2006.01)
*B01D 21/00* (2006.01)
*B03D 1/14* (2006.01)
*B01D 17/02* (2006.01)
*C02F 1/00* (2006.01)
*C02F 101/32* (2006.01)

(52) U.S. Cl.
CPC ..... *B01D 21/0045* (2013.01); *B01D 17/0205* (2013.01); *B01D 21/0039* (2013.01); *B03D 1/1406* (2013.01); *C02F 1/00* (2013.01); *C02F 1/004* (2013.01); *C02F 1/24* (2013.01); *C02F 2101/32* (2013.01)

(58) Field of Classification Search
CPC ............ B01D 17/0205; B01D 21/0045; B01D 21/0039; C02F 1/00; C02F 1/24; C02F 1/004; C02F 2101/32; B03D 1/1406
See application file for complete search history.

(56) References Cited

U.S. PATENT DOCUMENTS

| | | | | |
|---|---|---|---|---|
| 5,130,029 A * | 7/1992 | Suutarinen | ........... | B01D 24/205 210/703 |
| 5,766,484 A * | 6/1998 | Petit | ........... | B03D 1/24 210/221.2 |
| 7,981,287 B2 * | 7/2011 | Lambert | ........... | B01D 21/0012 210/104 |
| 8,080,158 B2 | 12/2011 | Lee et al. | | |
| 8,518,266 B2 * | 8/2013 | Roberts | ........... | B01D 17/0205 210/221.2 |
| 2007/0114183 A1 * | 5/2007 | Lee | ........... | B01D 17/0211 210/703 |
| 2011/0114565 A1 * | 5/2011 | Roberts | ........... | B01D 17/0205 210/703 |

OTHER PUBLICATIONS

International Preliminary Report on Patentability regarding International Application No. PCT/CA2014/050764, dated Feb. 14, 2017.

* cited by examiner

*Primary Examiner* — Thomas M Lithgow
(74) *Attorney, Agent, or Firm* — Stephen T. Olson; Harness, Dickey & Pierce, P.L.C.

(57) ABSTRACT

A separation tank for separating a contaminant from a contaminated fluid. A series of juxtaposed interconnected chambers having a series of baffles therein provide a revolving flow of fluid in each chamber to maximize distance for which contaminants travel to separate from the fluid. The interconnected chambers may be juxtaposed in end-to-end relation or in side-by-each configuration.

18 Claims, 20 Drawing Sheets

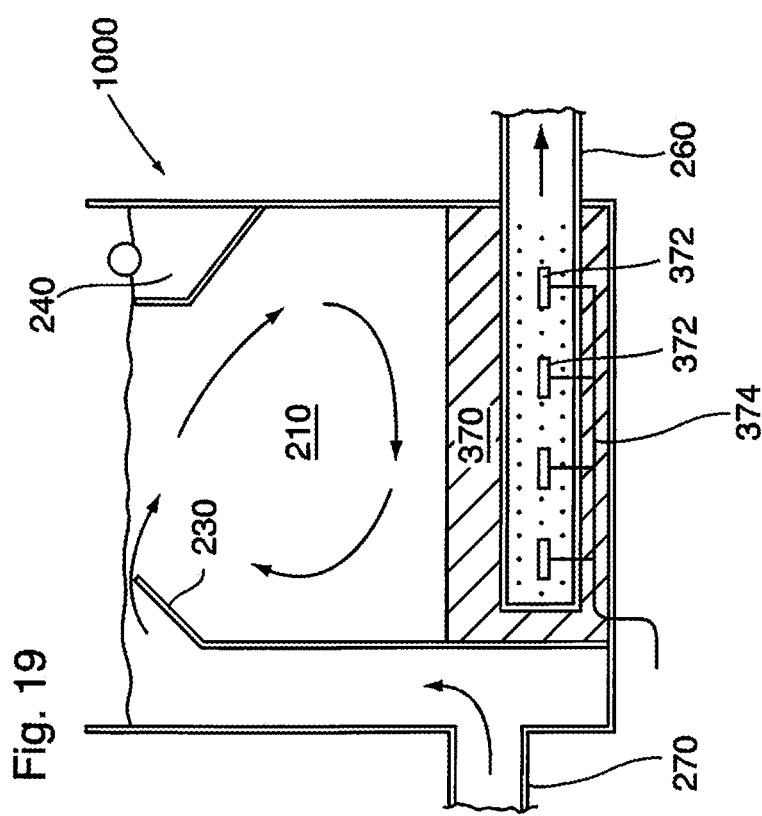

PHASE SEPARATION TANK

CROSS-REFERENCE TO RELATED APPLICATIONS

This application claims the benefit and priority of Canadian Patent Application No. 2,859,028 filed 11 Aug. 2014. The entire disclosure of the above application is incorporated herein by reference.

FIELD

The present invention relates to vessels/tanks for separating contaminants or unwanted phases from fluids such as produced water during well drilling operations.

BACKGROUND

Secondary phase separation vessels/tanks are used to separate an unwanted secondary phases or contaminants such as hydrocarbons from produced water, and generally operate by allowing or facilitating the rising of the unwanted phase(s) or contaminants to the surface of produced water. The unwanted phases or contaminants may then be removed via skimming of the surface of the produced water.

Examples of secondary phase separation vessels/tanks include:

API separators which employ gravity-based separation techniques;

Induced Gas Flotation (IGF) devices, which use injected gas bubbles to aid in separating phases and contaminants; and Induced Static Flotation (ISF), which likewise use gas bubbles to aid in separating phases and contaminants.

One of the problems with the latter two types of secondary phase separation vessels/tanks is that they do not allow sufficient time, namely time for effective distribution of the gas bubbles within the contaminated fluid and time to allow for such gas bubbles to attach themselves by natural agglomeration to contaminants or unwanted phases to then cause or bring such contaminants or unwanted phases to the surface via flotation for subsequent removal via skimming.

Specifically, in the case of the latter two types of secondary phase separation vessels/tanks, gas bubbles are typically introduced into the center of a chamber via a pipe (referred to as a sparging pipe, and a sparging process), or generated mechanically via motor-driven paddles. Such methods of introducing gas bubbles into the center of the chamber reduces the likelihood of contact of gas bubbles with contaminants which may not be located in the center of the chamber.

Moreover, existing prior art tanks are typically designed to allow contaminants to be floated to the surface of the tank due to differential specific gravities between for example oil and water, and/or to allow agglomeration of gas bubbles to contaminants which causes such contaminants to rise to the surface of the tank. Both techniques then allow for skimming of the contaminants from the surface of the tank and resulting purification of the remaining liquids (leaving the cleanest fluid in the bottom of the tank/vessel). However, both technologies further transfer fluid from the bottom of the chamber (i.e. the cleanest fluid in the chamber being in the bottom of the chamber) when transferring such fluid to a further subsequent chamber for repetition of the process and for subsequent successive purification, in a process that can be termed "bottom to bottom" flow. Problematically with bottom flow, when such fluid is then transferred into a bottom of a subsequent chamber (namely to an area where the cleanest fluid in such subsequent chamber should be) such allows for "short circuiting"-namely allowing such water to again pass from the subsequent chamber to a still further subsequent chamber (i.e., bottom to bottom flow) without sufficient residence time within each chamber to allow removal of impurities therefrom by gas flotation or specific gravity separation.

Also problematic in such "bottom to bottom flow is the so-called "dilution" effect, namely that when injecting cleaned fluid (i.e., the cleanest fluid) from a first chamber into a second successive treatment chamber (where such cleanest fluid from such first chamber is effectively the most contaminated fluid in the second chamber), such fluid is injected into the bottom of the second chamber, where the cleanest fluid typically is situated. This "dilution" effect thereby undoes, to some extent, the phase separation already accomplished, and adds to required residence time to further effect separation.

U.S. Pat. No. 5,766,484 ("the '484 patent") teaches a tank having an inlet baffle, and providing in FIG. 1 thereof a skimming means 30 and weir means to skim and collect contaminants from the surface, or alternatively simply only a weir to collect contaminants from surface. However, the '484 patent fails to teach apparatus and method which may be easily adapted for successive treatment via a series of chambers, in that it merely teaches a treatment tank having both introduction and removal of fluid from the same side of the tank, which is problematic for use in creating a compact juxtaposed series of chambers for successive treatment of fluids.

Accordingly, improved separation vessels/tanks which avoid the short-circuiting problem and the related "dilution" problem, which better facilitate contaminant-gas bubble contact throughout a fluid to be treated, and which further allow for a compact arrangement of chambers for successive treatment of fluids, are accordingly needed.

SUMMARY

The present invention strives to provide a separation tank for removing a contaminant from a fluid, or for separating a phase from a multi-phase fluid which is input into the tank, which reduces or avoids the aforementioned "short circuiting" and dilution problems and better facilitates gas-contaminant contact and agglomeration.

Accordingly, in a first broad aspect of the present invention comprises a separation tank for removing a contaminant from a fluid or separating a phase from a multi-phase fluid which is input into the tank, said tank comprising:

a floor defining a bottom of the tank and depending walls defining the sides of the tank;

a plurality of interconnected chambers within said tank for successively treating said fluid;

an inlet in fluid communication with a first chamber of the plurality of chambers, for inputting a fluid comprising a contaminant or a plurality of phases to said first chamber; and an outlet in fluid communication with a last chamber of said plurality of adjacent chambers, for outputting fluid with reduced contaminant or substantially comprising only a single phase, the outlet positioned proximate a bottom of said last chamber of the plurality of adjacent chambers;

a sloped weir within an upper region each of said chambers, for inducing a rotational flow of said fluid within each of said chambers;

a skim oil trough in association with a plurality of said interconnected chambers and separated from an interior of said plurality of chambers by a skimming weir, the skimming weir situated in an upper region of each of said chambers substantially opposite the location of the sloped weir in said plurality of chambers, said rotational flow of fluid being along an upper surface of said chamber causing movement of said fluid from said sloped weir towards said skim oil trough; and an interconnecting passage, allowing fluid flow from substantially a bottom of at least one chamber to an upper region of an adjacent chamber and towards the sloped weir in said adjacent chamber, said interconnecting passage positioned within said at least one chamber such that fluid flow from said at least one chamber to said interconnecting passage is not in a direction of the rotational flow of said fluid in said at least one chamber.

In preferred embodiments, the interconnecting passage is adapted to output fluid from the at least one chamber into an upper region of an adjacent chamber, to thereby avoid "bottom to bottom" flow, and thus the aforementioned "short-circuiting" problems.

A gas inlet, in fluid communication with the interconnecting passage of the at least one chambers, is preferably provided, for introducing a gas into the fluid being transferred from said one chamber to the adjacent (juxtaposed) chamber via the interconnecting passage. In a further preferred embodiment, where there are a plurality of interconnecting passages between pairs of adjacent (juxtaposed) chambers, the tank is further provided with a gas inlet in communication with each of the interconnecting passages of the chambers for introducing gas into the fluid being transferred from one chamber to the adjacent chamber via the interconnecting passage.

In a further preferred embodiment the interconnecting passage is narrower in cross-section than the chambers, to provide for a higher gas to fluid ratio in the interconnecting chamber than if said gas was introduced directly into one of said series of adjacent chambers.

In a further preferred embodiment an inlet end of each (or the) interconnecting passage is positioned substantially below the sloped weir of a corresponding chamber, and proximate a bottom thereof. Alternatively, or in addition, the inlet end of the interconnecting passage between at least one chamber and an adjacent chamber is located in said at least one chamber on a wall thereof, said wall having proximate an opposite side thereof said sloped weir contained in a successive adjacent chamber, with fluid flow to said interconnecting passage not in a direction of the rotational flow imparted in the at least one chamber.

To avoid the fluid flow to the interconnecting passage not being in a direction of the rotational flow imparted in the at least one chamber (to thereby avoid or reduce "short-circuiting" problems), a shield is preferably provided for partially blocking the inlet end of the interconnecting passage, to cause fluid to flow in a direction transverse to, or at least different from, that of the rotational flow.

Each chamber, except possibly the last chamber from which the treated water is removed, is provided with a skim oil trough in communication with the chamber. In a preferred embodiment the skim oil trough is a communal skim oil trough in communication with multiple or all of the chambers.

In a further preferred embodiment of the separation tank of the present invention, to provide transportability and ease of transportation the tank is contained within a shipping container.

In one embodiment, the plurality of interconnected chambers are arranged in mutual side-by-side juxtaposed configuration, and wherein an inlet end of the interconnecting passage is positioned substantially below the sloped weir of the one chamber proximate a bottom of each of said series of adjacent chambers.

In another embodiment, the plurality of interconnected chambers are arranged in mutual end-to-end configuration, further comprising a shield positioned below said skimming weir in said plurality of chambers for partially blocking the inlet end of the interconnecting passage, with said interconnecting passage situated at a location below said shield and permitting fluid flow from substantially a bottom of at least one chamber at said location to an upper region of an adjacent chamber and towards the sloped weir in said adjacent chamber.

In a further embodiment, the plurality of interconnected chambers are arranged in mutual end-to-end configuration, and are further arranged in mutual side-by-side juxtaposed configuration. In such manner successive chambers aligned in an end-to-end manner may successively treat a fluid, with further chambers arranged in juxtaposed position thereto to similarly successively treat further inlet streams.

Finally, in a further embodiment, the phase separation tank may contain, in a lower region of at least one of said chambers, a filter media, which in a preferred embodiment said filter media is a non-fixed granular media, such as granulized pellets, or walnut shells, to provide filtering of the fluid being treated.

A plurality of radial nozzles may be located within the filter bed. The radial nozzles may disperse, using a gas or a liquid, the filter media during a backwash cycle to cause sufficient turbulence and agitation of the filter media granules to liberate the trapped contaminants without the need for high liquid flow rates. The number of nozzles and their placement within the filter bed depend on factors such as size and shape of the filter vessel and the type of filter media being cleaned, similar to the configuration and positioning of radial nozzles as taught and disclosed in Chen (Canadian Patent No. 2,689,487).

DRAWINGS

The accompanying drawings illustrate one or more exemplary embodiments of the present invention and are not to be construed as limiting the invention to these depicted embodiments. The drawings are not necessarily to scale, and are simply to illustrate the concepts incorporated in the present invention.

Figure 16:
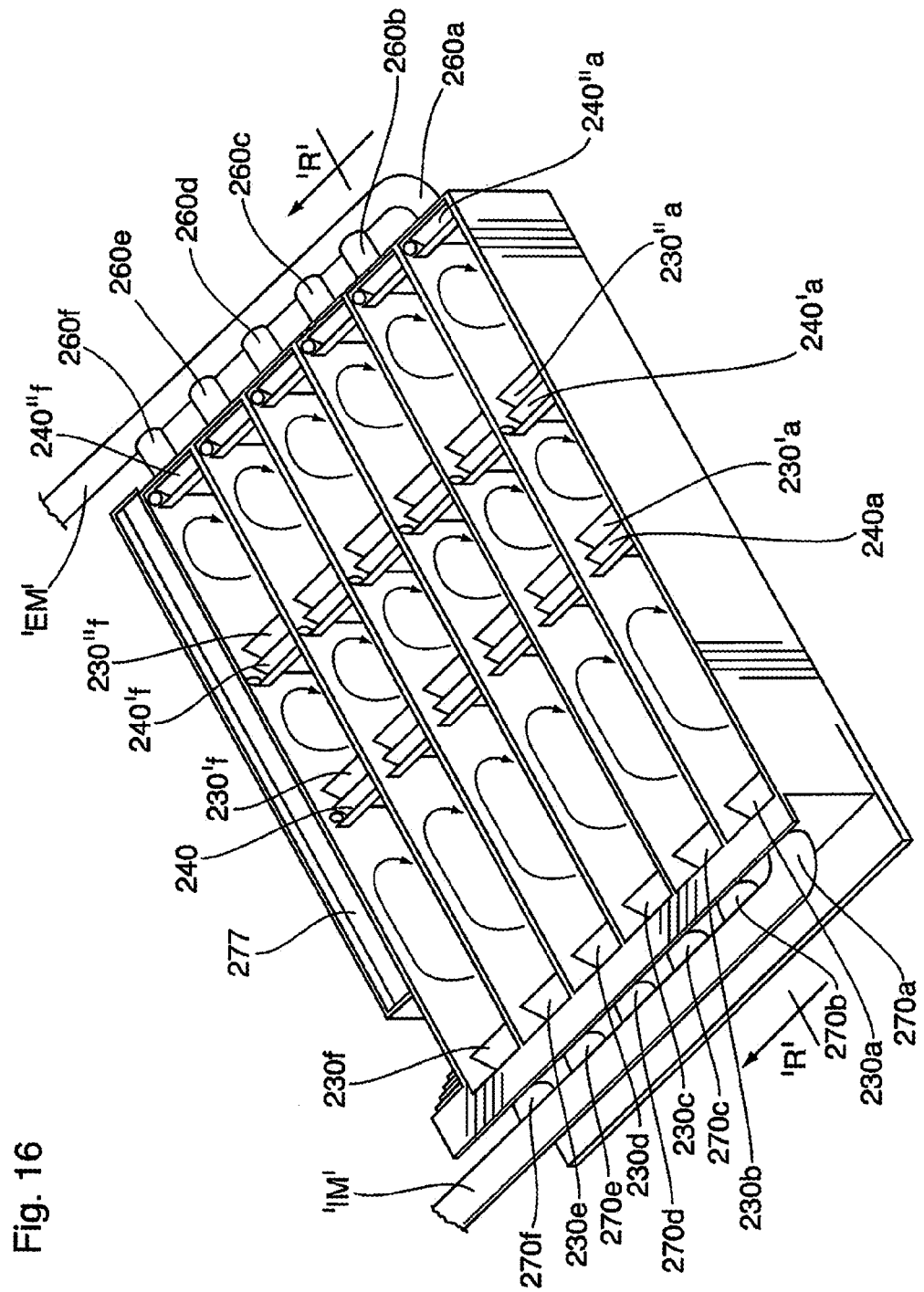
Figure 17:
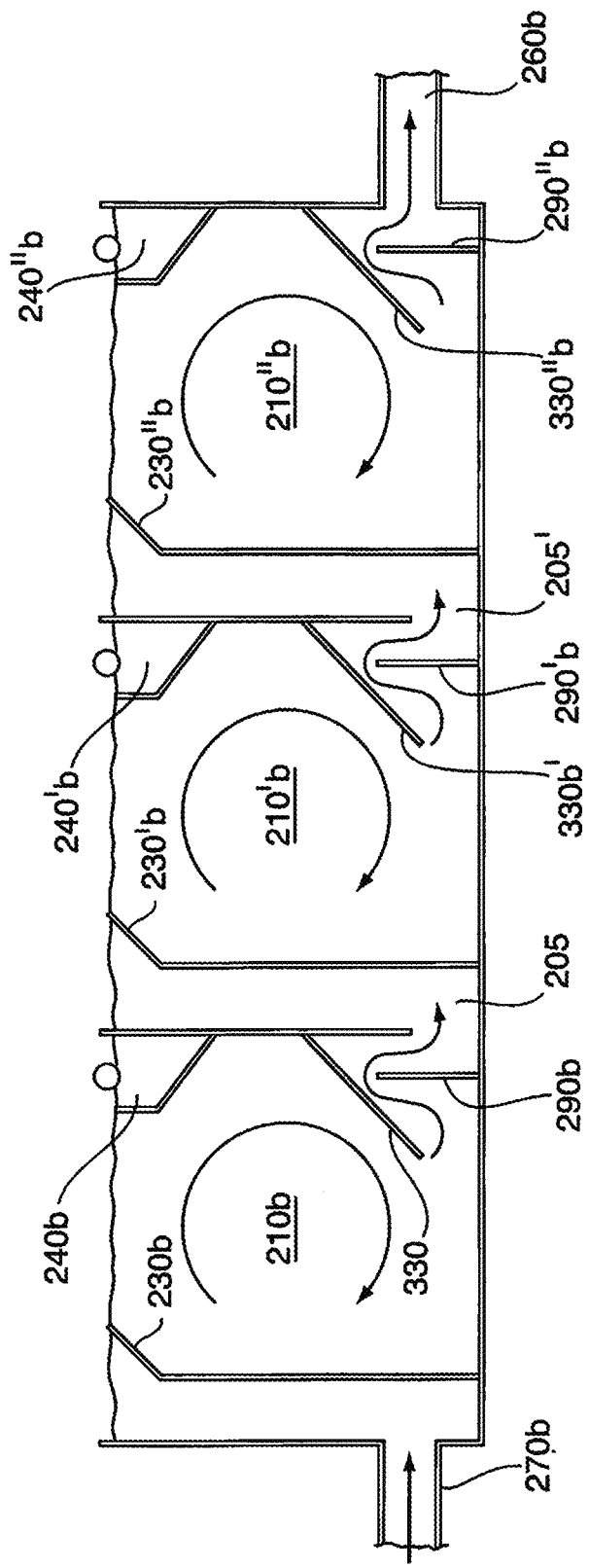
Figure 18:
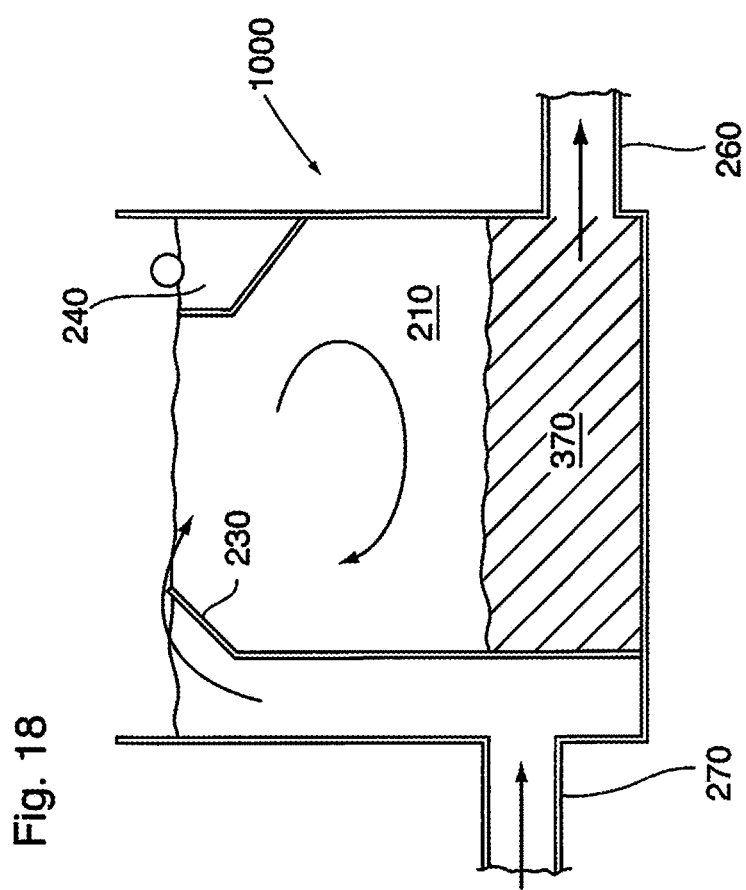

FIG. 16 is a perspective view of yet another embodiment of the secondary phase separation tank of the present invention, wherein successive chambers are aligned in an end-to-end manner for successive treatment of a fluid, with further chambers arranged in juxtaposed position thereto, to thereby successively treat a plurality of inlet streams (hereinafter the so-called successive plurality version or "SPV" version);

FIG. 17 is a sectional view along plane 'R'-'R' of FIG. 16, namely along a longitudinal plane 'R'-'R' through one series of longitudinally aligned successive chambers;

FIG. 18 is a cross-sectional view of a further embodiment of a secondary phase separation tank and method of the present invention, further having filter means, which may comprise and in the embodiment shown does comprise, a non-fixed media filter bed; and FIG. 19 is a similar cross-sectional view of a slightly modified form of the invention shown in FIG. 18.

DETAILED DESCRIPTION

In one non-limiting embodiment there is provided a secondary phase separation tank 10 for removing contaminant including an unwanted phase from an input fluid, such as produced water. The separation tank 10 includes a floor and walls that generally define the tank. Within the tank, a series of chambers are divided by partitions. In communication with each chamber is a skim oil trough into which contaminant or the unwanted phase is skimmed. The skim oil trough is separated from the chamber by a skim oil weir over which the contaminant or unwanted phase passes where it is then captured in the skim oil trough. Fluid input into the tank passes from chamber to adjacent chamber as contaminant is gradually removed. In each chamber, a sloped weir generates a longitudinally rotational current that generally increases the path (and thus the residence time) of the fluid in each chamber before the fluid passes to the adjacent chamber. The current also promotes any lighter than fluid contaminants to rise to the surface wherein it is skimmed over the oil skimming weir and removed. As fluid is passed from chamber to adjacent chamber it is removed from a bottom region of the first chamber, and passed to an upper region of the adjacent (successive) chamber.

In various embodiments of the separation tank, the chamber and sloped weir are of a suitable orientation and spacing to generate a rotational current within the chamber that includes a longer horizontal component then previous designs or a longer horizontal component that a vertical component. By increasing the horizontal travel of the fluid and particles and creating a longer path for the particles, rising unwanted particles thereby have a longer time to rise to the surface for removal and the unwanted contaminants are thereby, when skimmed, more effectively removed from the fluid. Specifically, the longer path gives the particles longer actual residence in a chamber as well as increased chances (through the longer path and being brought up to the surfaces) to come into contact and adhere to a bubble, to thereby become separated. Increasing the horizontal component of the rotational flow may be accomplished, for example, by changing the ratio of the length of the chamber and the height of the sloped weir. In addition, injecting the cleaned water from the bottom of the chamber, and injecting it in the upper region of the adjoining successive chamber avoids or at least greatly reduces the 'short-circuiting" problem.

To further promote rising of the unwanted phase or contaminants to the surface, gas may be introduced into chambers. As will be appreciated, typically, the gas, such as methane, air or nitrogen, disperses in the fluid and forms bubbles or micro-bubbles that adhere to the contaminant making it lighter than the fluid and promoting it to the surface. The gas, being lighter than the fluid, rises toward the surface of the fluid adhered to the contaminant. Again, by increasing the horizontal component of the rotational flow, the bubbles or microbubbles are more effective in promoting contaminants to the surface of the fluid for removal as the residence time is increased. Further, due to the induced rotational flow within each chamber, such induces a hydraulic push that aids in skimming, potentially thereby avoiding the need for mechanical skimming means to accomplish such skimming, and thereby avoiding increased cost of mechanical skimming means, maintenance thereof, and possible mechanical failure thereof resulting in contaminant or secondary phase re-entrainment.

All chambers, save perhaps the last chamber in the succession of chambers which merely has an outlet to remove the treated fluid, are connected via an interconnecting passage between each chamber. Fluid from one chamber passes to an adjacent chamber via the interconnecting passage. To further promote cleaner or less contaminated fluid to the next adjacent chamber, the interconnecting passages have their inlet positioned proximate the bottom of the chamber where the cleaner fluid tends to be thereby capturing fluid with less contaminant as the contaminant within the chamber rises to the surface. The fluid is then directed into the adjacent chamber for further decontamination/phase separation. As the fluid being transferred into the adjacent chamber is generally more contaminated than the fluid in the adjacent chamber, the interconnecting chamber may input the fluid into an upper region of the adjacent chamber where contaminant concentration is higher compared to a lower or bottom region of the adjacent chamber.

To further promote adherence of the gas to the contaminant or secondary phase in order to cause separation thereof from the fluid (typically water), control over the directional flow and location of injection of the gas is important. Specifically, the gas is more likely to adhere to the contaminant when the speed and direction of inlet flow of the gas is similar to the speed and direction of flow of the fluid. In this way, previous devices and methods which make no attempt to align flow of fluid with that of gas injection, and merely for example introduce the gas into middle area of the chamber, are inferior. Accordingly, to promote adherence of the gas to the contaminant or secondary phase and to influence the flow path of the gas to be more similar to the fluid, in the present invention, and in particular in the VSL embodiment herein being described, the gas is introduced into an interconnecting passage between two adjacent parallel chambers situated low in the first chamber, where such gas and gas bubbles can then rise when travelling to the second chamber with the flow of fluid therein to surface and create adhere to contaminants and/or secondary phase at surface, and prevent them from travelling with the continuous circular flow in the second chamber, which would then be travelling thereafter downwardly, and thus remain on surface for skimming. The alignment of the gas flow being injected into the fluid, and the fluid and contaminants and/or secondary phase therein, causes greater ability of the gas bubbles to then adhere to such particles, contaminants, or secondary phase with within such fluid, and maintain them at surface. It is desirable for the gas to flow parallel with the fluid flow at such location, to promote adhesion to contaminants and/or secondary phase.

As will be appreciated, the gas may be introduced in all or some of the interconnecting passages. It is within the scope of the invention that the interconnecting passages are similar in cross section or smaller in cross section than the chambers themselves and further, the interconnecting passages can be of different sizes, shapes or orientations from chamber to chamber. Further, a plurality of gas injection sites may be used in each chamber including the interconnecting passages. Further, the outlet of the interconnecting passages may be in suitable proximity to the sloped weir of the adjacent chamber to impart a rotational flow on the fluid exiting from the interconnecting passage.

Example 1—First Embodiment ("VSL")

In one embodiment best shown in FIGS. 1A, 1B, 2, 3, hereinafter the "VSL" embodiment, a secondary phase separation tank 10 is provided for removing a contaminant such as hydrocarbons, drilling fluids, and/or fracking fluids, and which may thus comprise fluids of different specific gravity, viscosity, and miscibility as compared to water. Separation tank 10 includes a floor 50 and pending walls 40 that define a series of chambers 100, each chamber 100 separated from an adjacent chamber by a partition 105. It will be appreciated that although the tank 10 shown in FIG. 1A to FIG. 5B includes four chambers 100, the tank 10 may include fewer or more chambers 100 and the separation tank 10 should not be limited to only four chambers 100.

In communication with each chamber is a skim oil weir 70, which in addition to serving as a weir further serves to separate a skim oil trough 60 from each chamber 100. Surface contaminant in each chamber 100 is removed by skimming over the skim oil weir 70 into the skim oil trough 60 wherein it may then be captured and/or removed as desired using conventional methods and means. The skim oil weir 70 shown in the embodiments of FIG. 1A to FIG. 5B is a communal skim oil trough 82 in that a single skim oil trough is adjacent all chambers of the tank 10.

To impart a longitudinal rotational current in each chamber 100, each chamber 100 comprises a sloped weir 90. The nature of the sloped weir 90 imparts a rotational flow to the fluid within each chamber 100. The rotational flow of the fluid in the chambers 100 may be seen in the flow diagram shown in FIG. 4.

Connecting each chamber 100 is an interconnecting passage 80. The interconnecting passage 80 has an inlet portion in fluid communication with a bottom region of a chamber 100 and an outlet portion in fluid communication with the adjacent chamber. In the embodiment shown, the interconnecting passage 80 has the outlet positioned in an upper region of the adjacent chamber in proximity to the sloped weir 90 of the adjacent chamber to impart a rotational current to the fluid input into the adjacent chamber 100. Further, the interconnecting passage 80 has the outlet portion in the upper region of the adjacent chamber as, generally, the fluid in each chamber has a higher concentration of contaminants towards the surface and is less contaminated towards the bottom. By removing fluid form the chamber 100 at or near the bottom of the chamber 100 and inputting the fluid in an upper region of the adjacent chamber, fluid of a lower concentration of contaminants is passed to the adjacent chamber into the region of highest contamination for that chamber. This reduces or eliminates so-called "short-circuiting" and also facilitates removal of contaminants or secondary phase over the skim oil weir 70.

The separation tank 10 also includes a fluid input 20 in communication with the first chamber of the series of interconnected chambers 100 for inputting untreated fluid into the tank 10, such as produced water that typically contains hydrocarbons as a contaminant. To remove decontaminated fluid from the tank 10, an outlet 30 in communication with a lower portion of the final chamber of the tank 10 is used. As the fluid closer to the bottom of each chamber 100 generally contains a lower concentration of contaminant, it is suggested that the output 30 be positioned in a bottom region of the final chamber.

Figure 1:
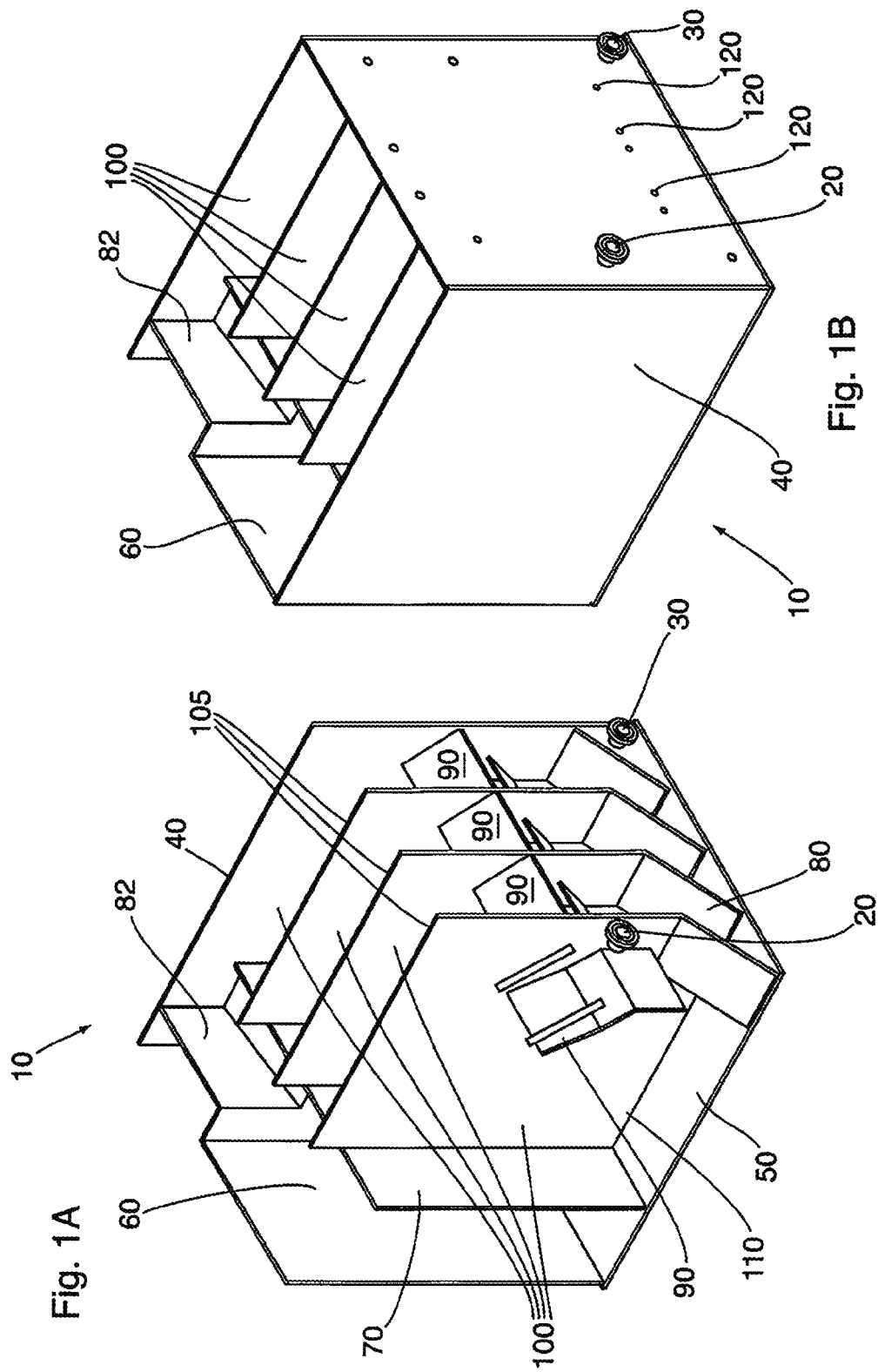
FIG. 1A is a schematic illustrative of a front isometric view of a secondary phase separation tank of the present invention, namely the so-called "VSL" embodiment, where the exterior wall has been removed to allow viewing of the internal chambers.
FIG. 1B is a schematic illustrative of the embodiment of the secondary phase separation tank of FIG. 1A wherein the exterior wall is in place.
Figure 2:
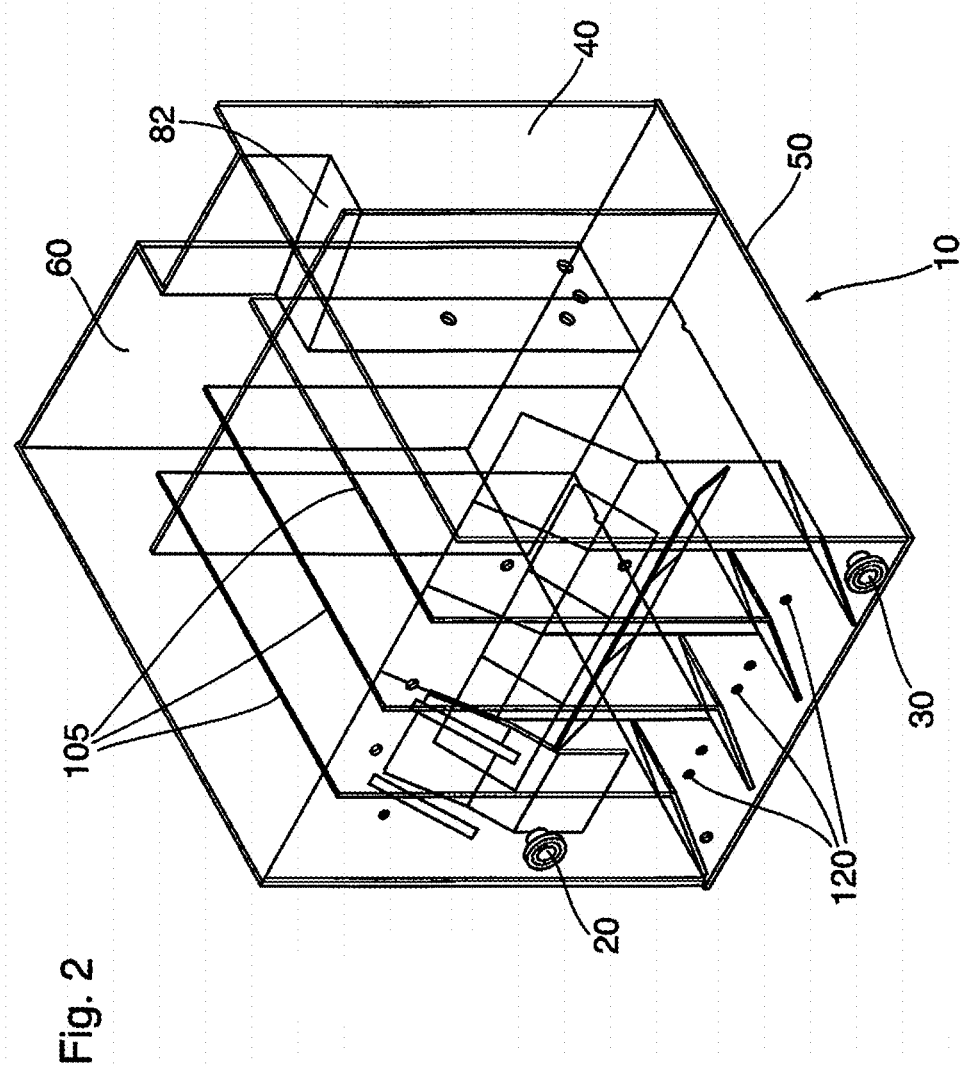
FIG. 2 is a schematic illustrative of the embodiment of the secondary phase separation tank of FIG. 1A, 1B wherein the components of the tank are translucent to allow view of the various components.
Figure 3:
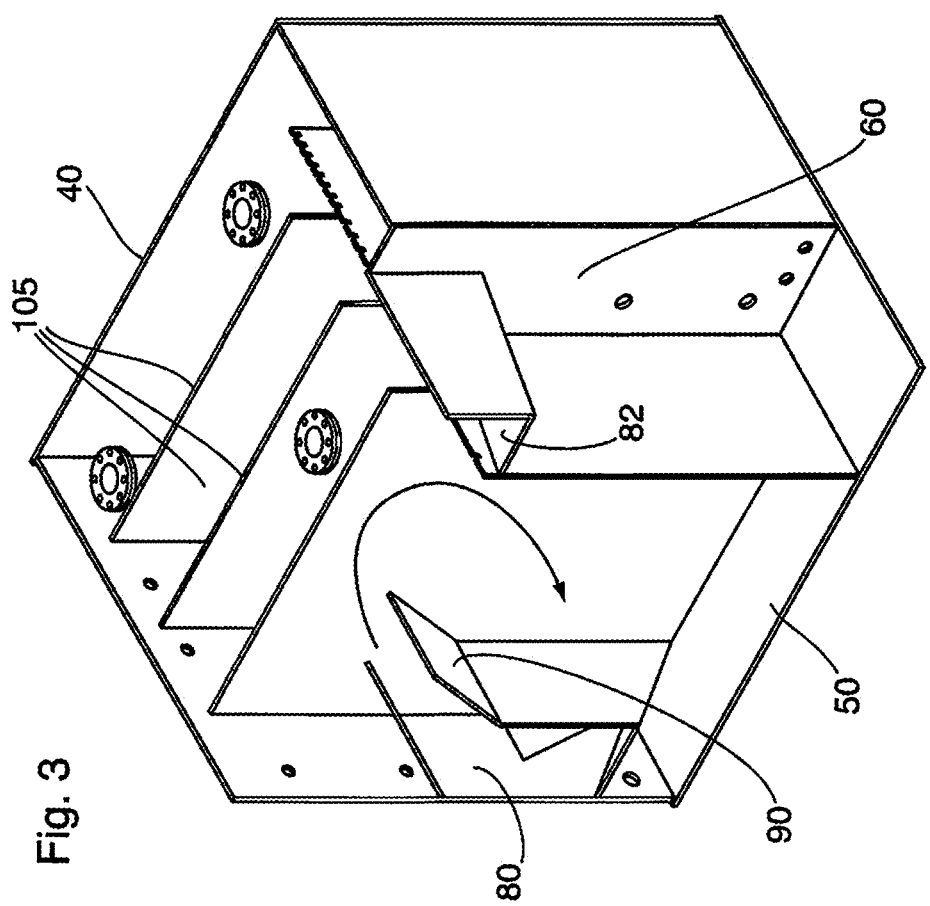
FIG. 3 is a schematic illustrative of the embodiment of the secondary phase separation tank of FIG. 1A, 1B showing the back side view of the tank.
Figure 4:
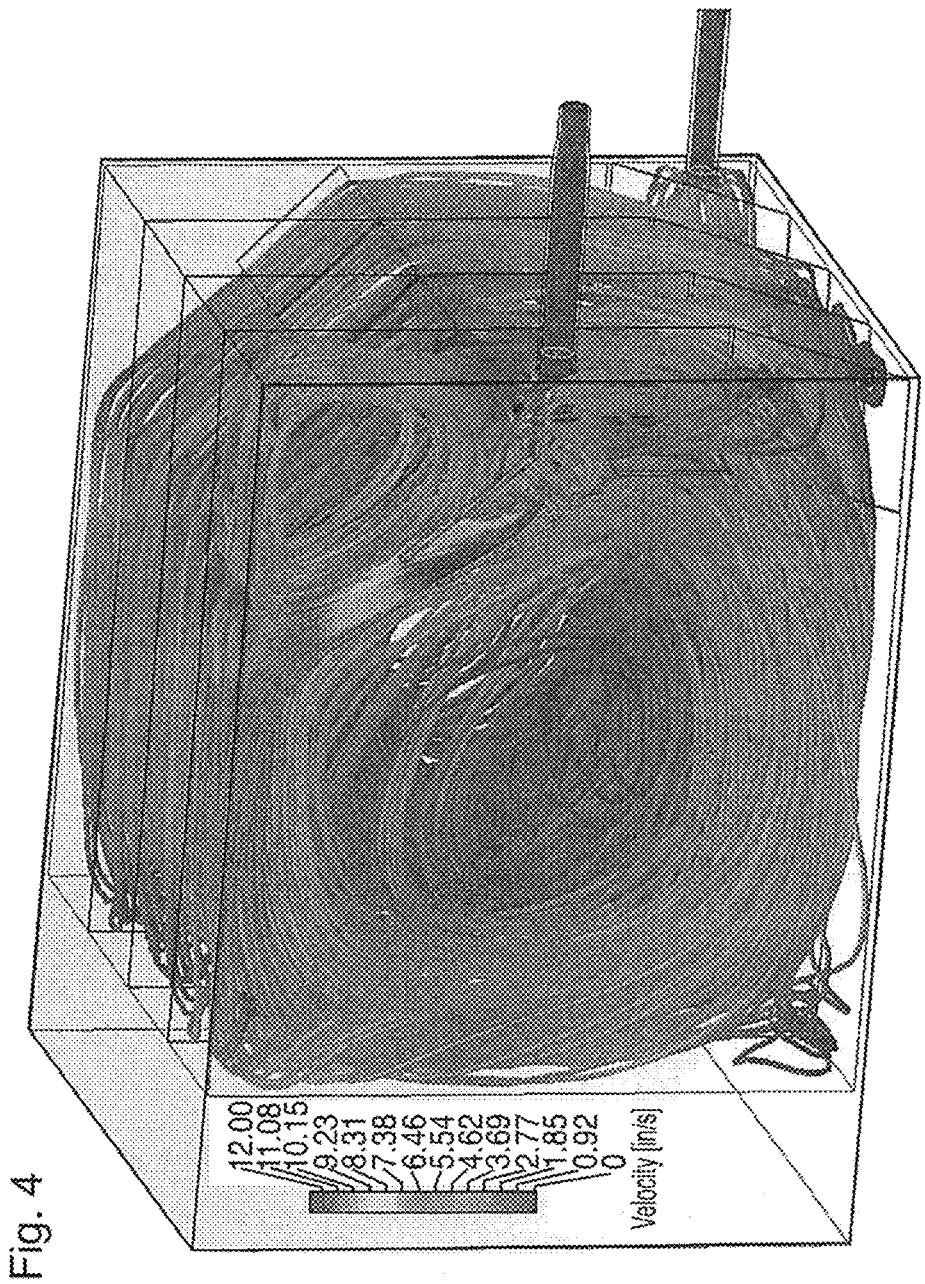
FIG. 4 is a flow diagram showing fluid flow through the secondary phase separation tank shown in FIG. 1A, 1B.

As shown in FIGS. 1B and 2, the separation tank 10 includes gas inlets 120 for introducing a gas into the interconnecting passages 80. In the first chamber 100, gas may be introduced with the input 20 or adjacent the input 20. In subsequent injection locations, the gas may be injected into the interconnecting passages 80. By injecting gas, such as air or nitrogen, into the interconnecting passages 80, the gas is more likely to adhere to contaminants in the fluid. This is believed to be because the volume of fluid passing through the interconnecting passages 80 is lower than the volume in the chamber 100 and therefore the volumetric ratio of gas to fluid in the interconnecting passage 80 is much higher than if the gas were to be injected directly into each chamber 100. In addition, the flow of fluid through the interconnecting passage 80 is generally in a uniform direction and therefore the gas flow will take on a similar flow pattern as the fluid passing through the interconnecting passage 80. The gas is more likely to adhere to the contaminants in the fluid if the flow patterns of the gas and the fluid are similar. In addition, by introducing the gas into the interconnecting passages 80, tight packing of bubbles instead of distribution of the bubbles as would be observed when introducing the gas directing into the chamber generates a higher probability of contact of contaminant or secondary phase with a gas bubble. All the fluid exiting each chamber 100 passing into the next chamber 100 passes through this packed zone of gas bubbles whereas if otherwise introduced centrally into the chamber 100 the gas disperses across a larger volume of fluid giving particles a lower probability of adhesion to a gas bubble.

As shown in FIG. 1A, the separation tank 10 also includes a drain hole 110 in the bottom of the partitions 105 to help in draining of the tank 10 if required.

Residence time in the separation tank 10 may be adjusted as desired based on the level of contaminants in the influent, the degree of decontamination desired, the number of chambers, the flow rate of the fluid, etc.

Figure 5A:
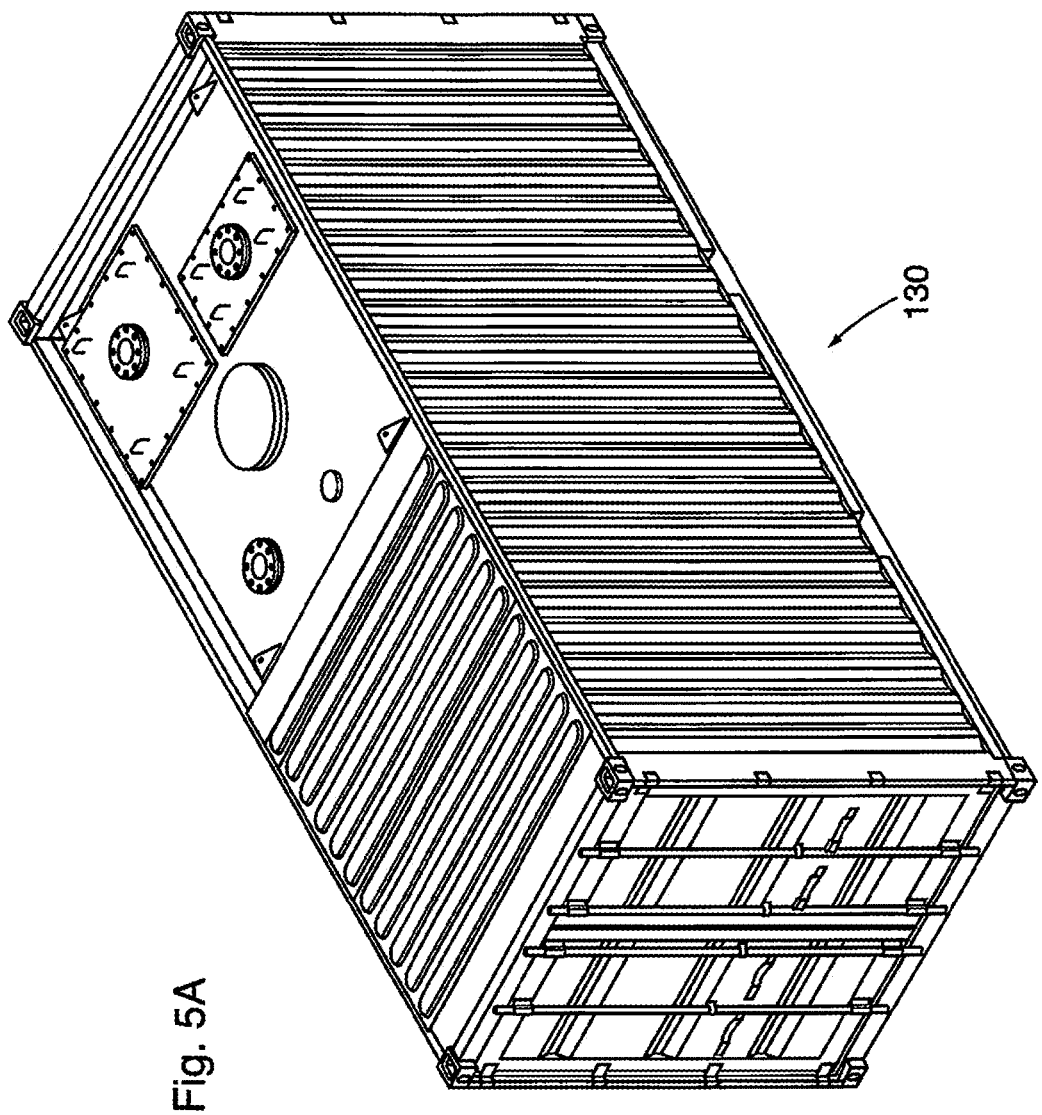
FIG. 5A is a schematic illustrative of a secondary phase separation tank such as that shown in FIG. 1A, 1B located within a portable sea container.
Figure 5B:
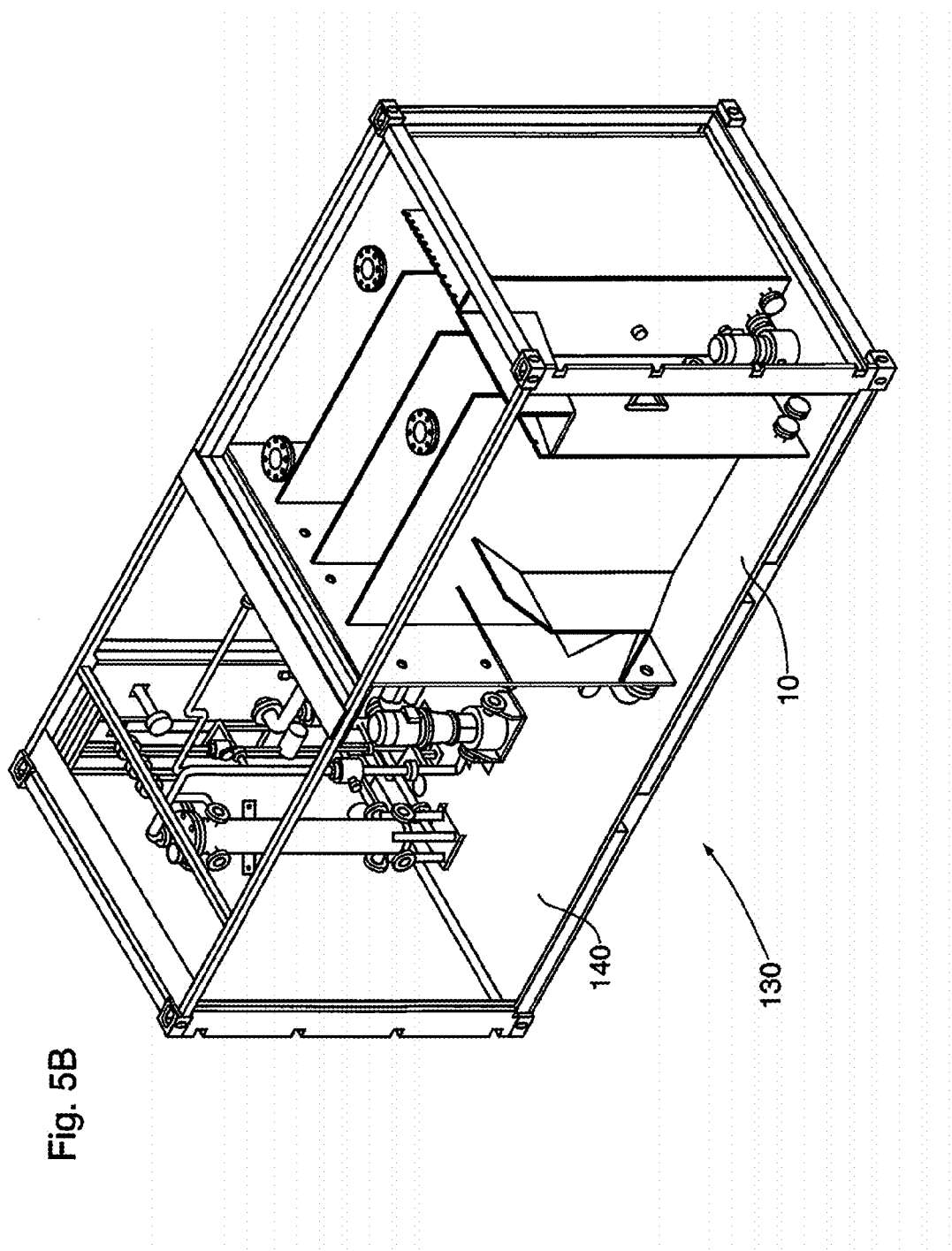
FIG. 5B is a schematic cutaway illustrative of a secondary phase separation tank such as that shown in FIG. 1A, 1B located within a portable sea container.
Figure 6:
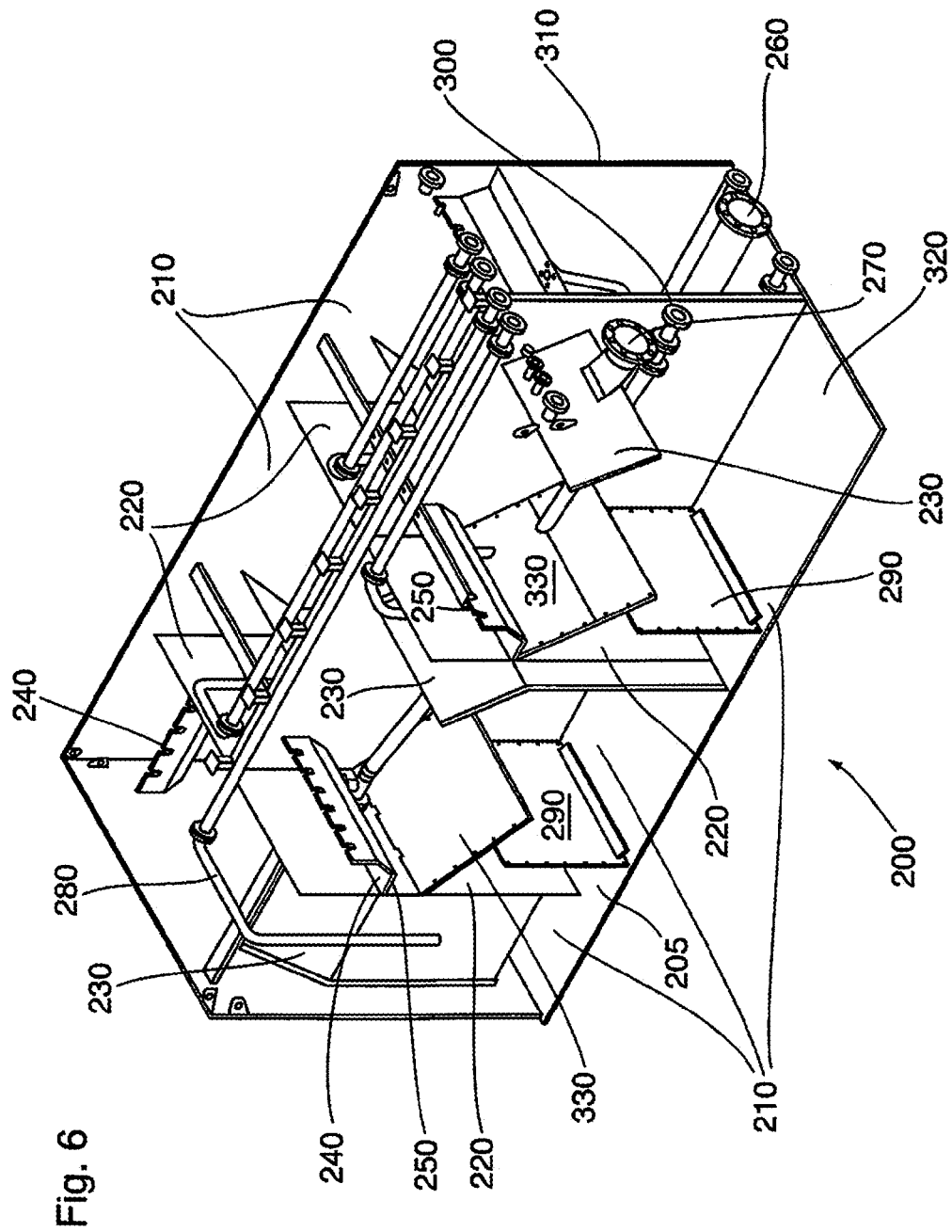
FIG. 6 is a schematic illustrative of a front isometric view of a further embodiment of a secondary phase separation tank of the present invention, namely the so-called "VS" embodiment, wherein the exterior wall has been removed to allow viewing of the internal chambers.
Figure 7:
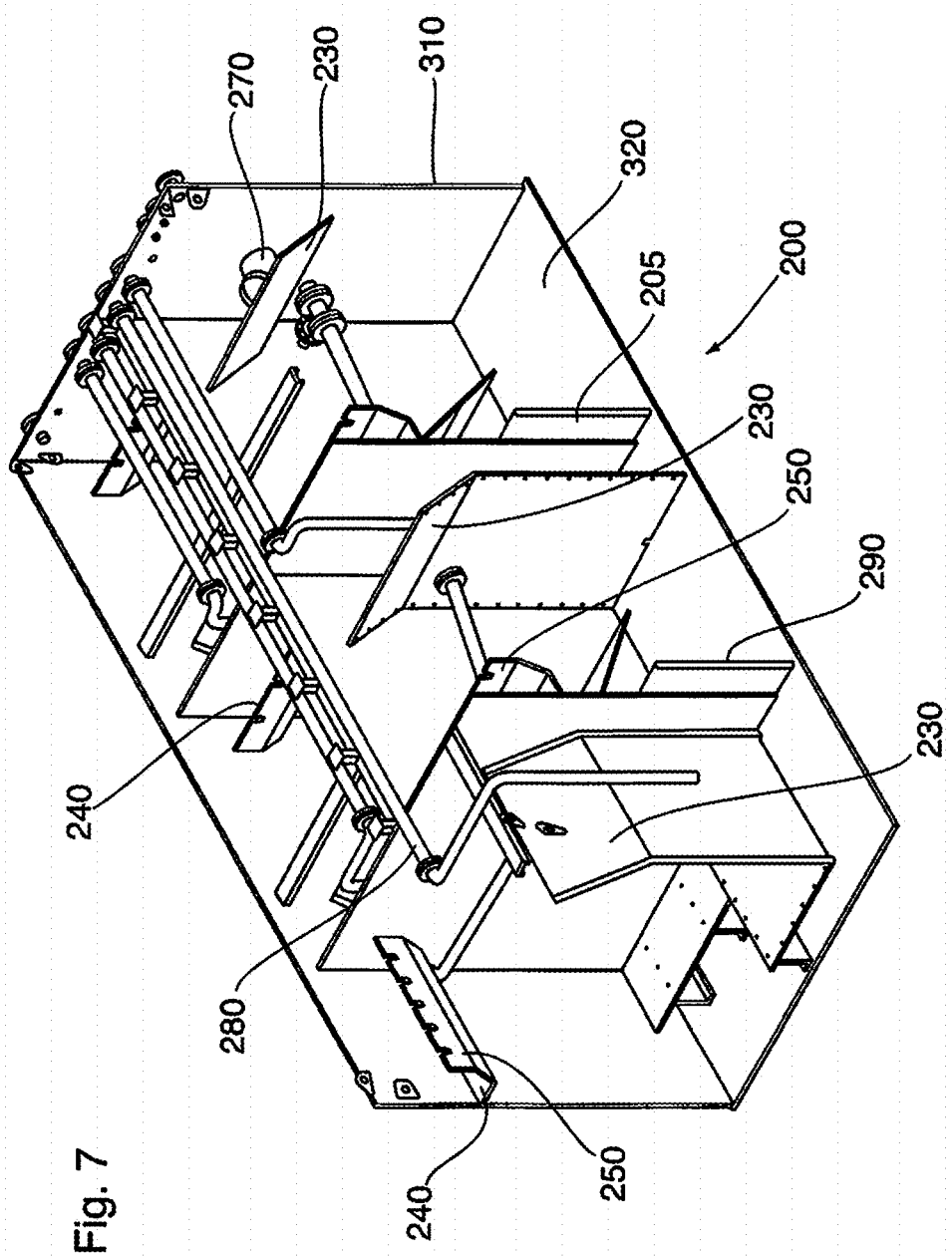
FIG. 7 is a schematic illustrative of a back left side isometric view of the embodiment of a secondary phase separation tank shown in FIG. 6 wherein the exterior wall has been removed to allow viewing of the internal chambers.
Figure 8:
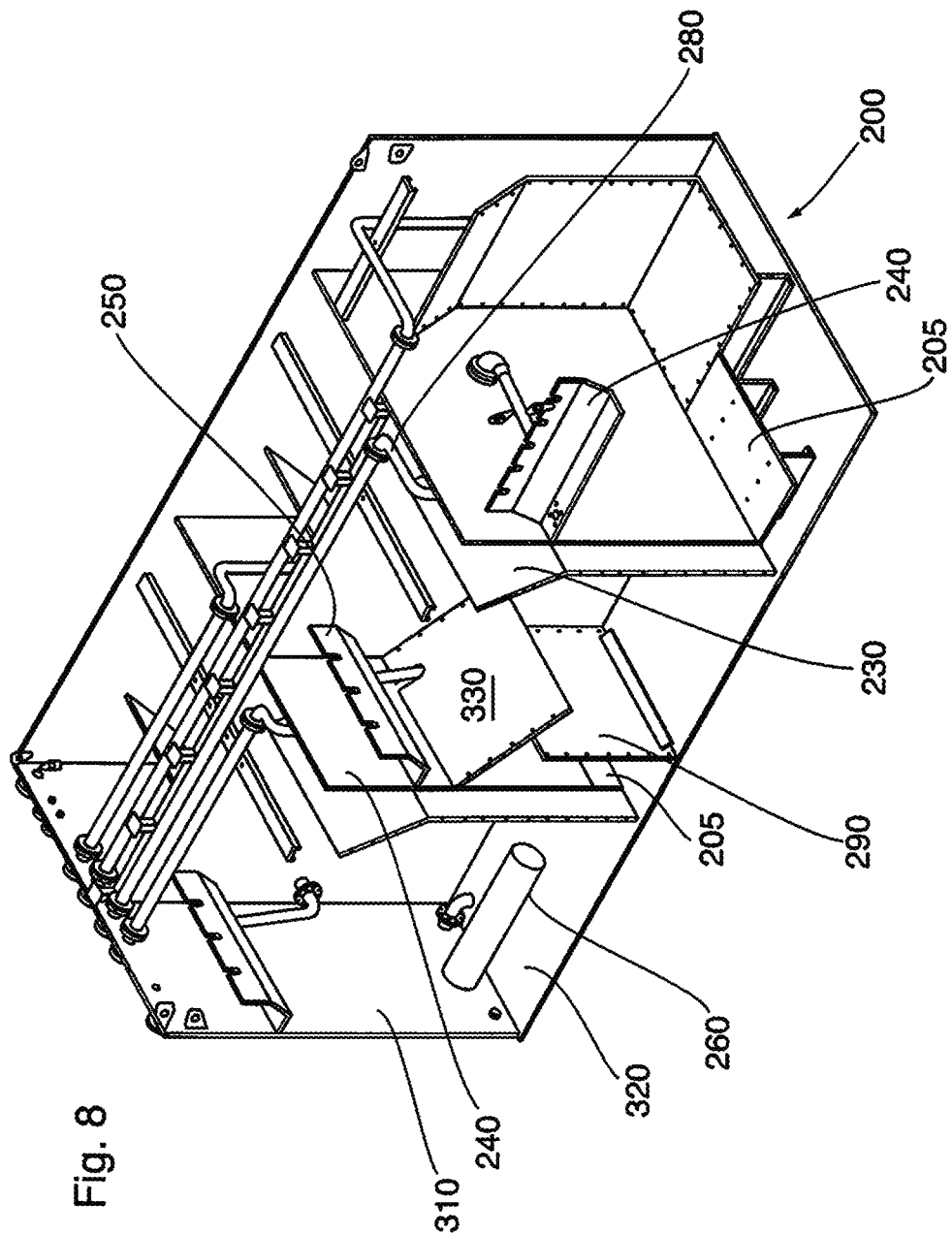
FIG. 8 is a schematic illustrative of a back right side isometric view of the embodiment of a secondary phase separation tank shown in FIG. 6 wherein the exterior wall has been removed to allow viewing of the internal chambers.
Figure 9:
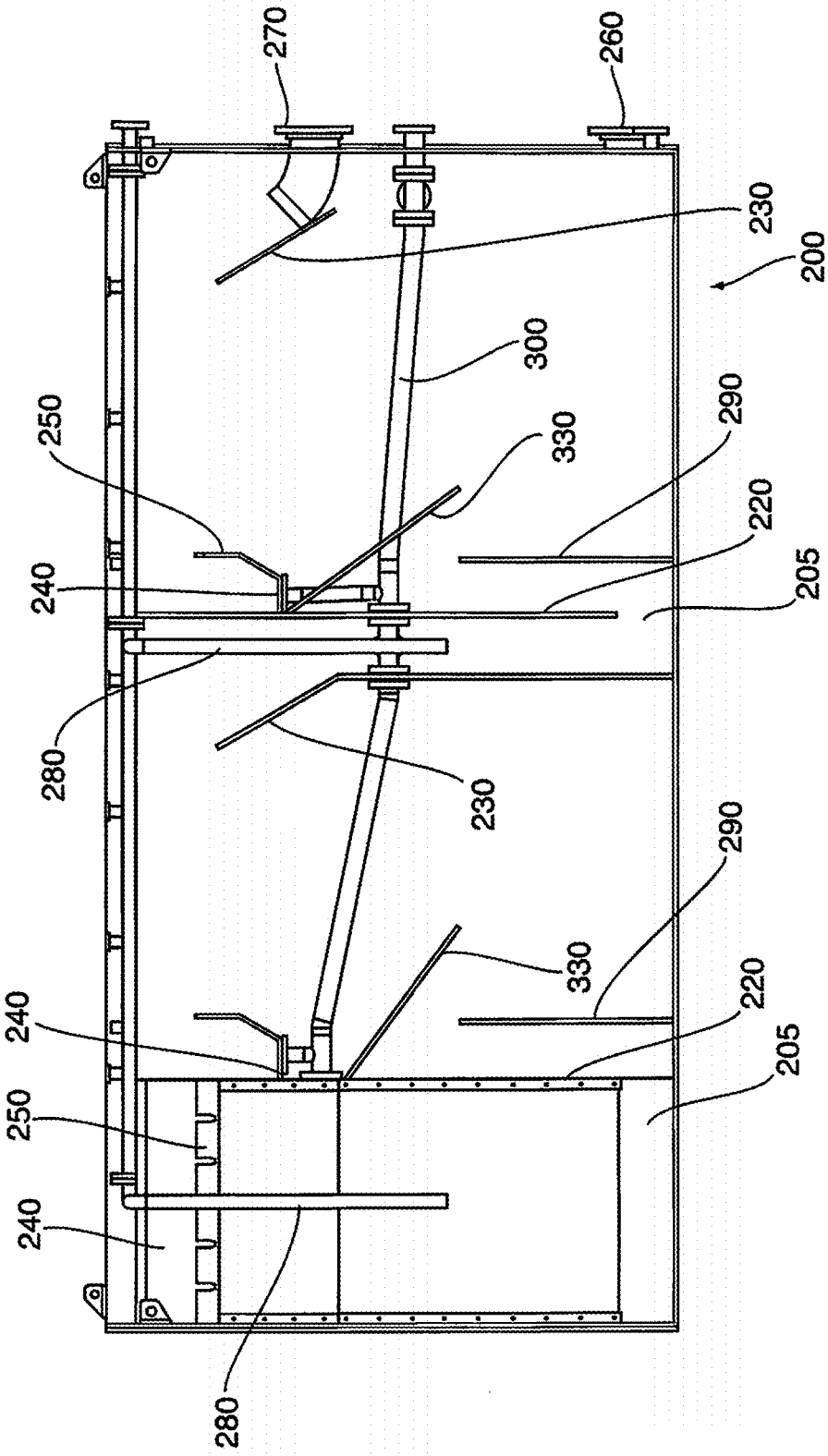
FIG. 9 is a schematic illustrative of a left side of the embodiment of a secondary phase separation tank shown in FIG. 6 wherein the exterior wall has been removed to allow viewing of the internal chambers.

The tank 10 may be placed in a portable sea container as shown for example in FIGS. 5A and 5B for facilitating transport of the separation tank 10. As shown in FIG. 5B, the associated pumps, piping and ancillary components of the tank necessary for input and outputting fluid, inputting gas, for example may also be captured within the portable sea container as shown at 140.

Example 2—Second Embodiment ("VS")

An alternative embodiment of a phase separation tank is shown with reference to FIGS. 6-15 and is shown generally at 200. As opposed to the VSL layout of the separation tank 10 shown with reference to FIGS. 1A to 5B, the VS tank 200 is comprised of a series of chambers 210 placed in end-to-end relation. Again, the tank 200 is defined by a floor 320 and pending walls 310. Each chamber 210 is separated by a partition 220. Similarly, each chamber 210 includes a sloped weir 230 to induce the rotational fluid flow in each chamber. The flow pattern of the input fluid may be seen in FIGS. 11 and 12.

Further, each chamber 210 is connected to the adjacent chamber via a interconnecting passage 205. However, the interconnecting passage 205 is defined by a gap at the base each partition 220 and the floor 320 through which fluid can pass. A divider plate 290 separates the chamber 210 from the partition and serves to define an inlet into the interconnecting chamber 205. Fluid passes over the divider plate 290 and through the gap at the base of the partition before entering the adjacent chamber over the back and then top of the sloped weir 230 of the adjacent chamber.

In one variant of this embodiment, best shown in FIGS. 6-10, each chamber 210 has an individual skim oil trough 240 separated from the chamber by a skim oil weir 250 incorporated into the skim oil trough 240. A contaminant outlet pipe 300 in fluid communication with each of the skim oil troughs 240 allows withdrawal of the collected contaminant in each skim oil trough 240. It will be appreciated that any suitable means may be used to remove contaminant from the skim oil troughs 240.

Figure 11:
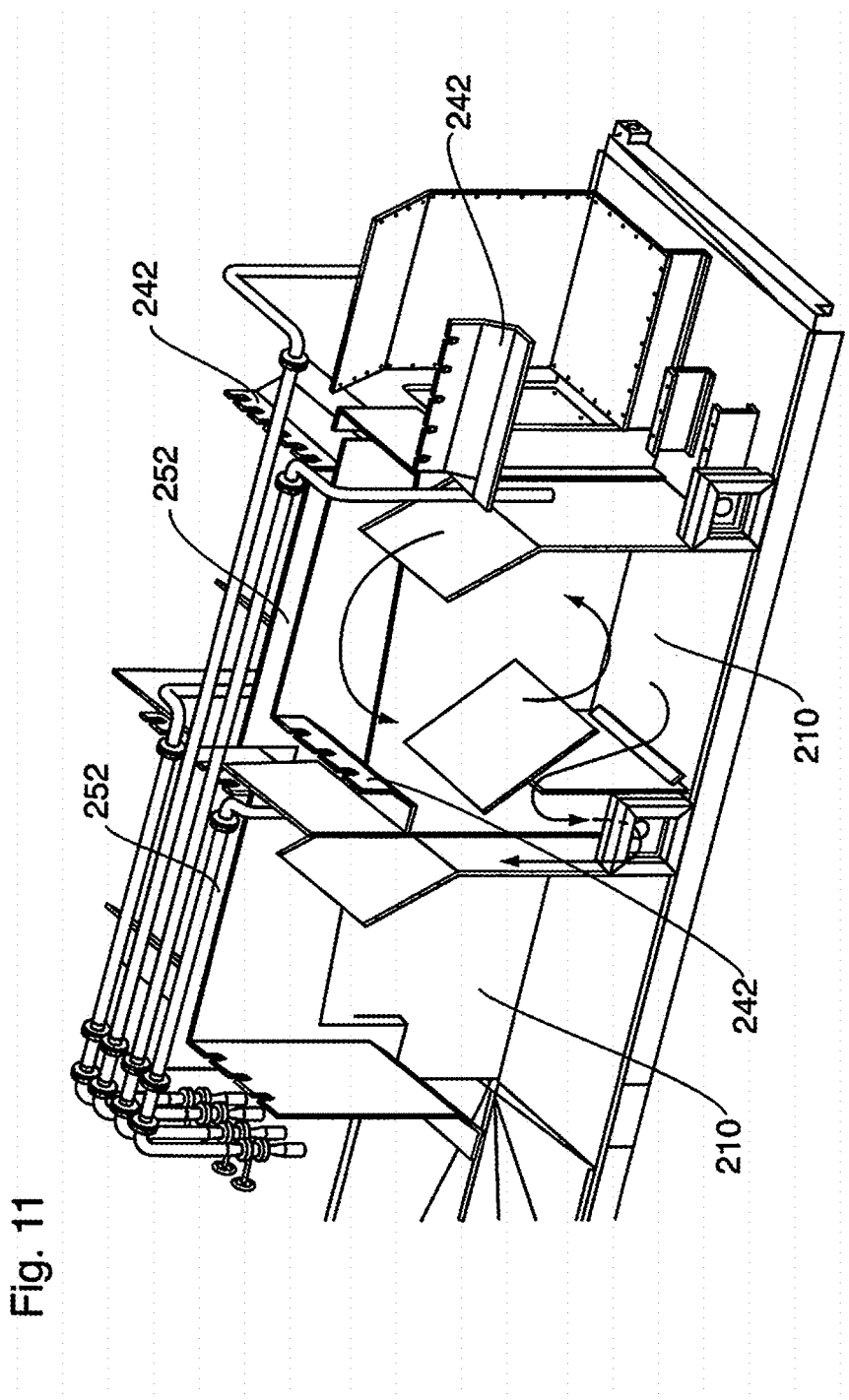
FIG. 11 is a schematic illustrative of a right side of another embodiment of the invention, similar to the embodiment shown in FIG. 10, wherein the exterior wall has been removed to allow viewing of the internal chambers.

In another variant of the "VS" configuration shown in FIG. 11 (FIG. 11 being a schematic illustrative of a right side of the "VS" configuration wherein the exterior wall has been removed to allow viewing of the internal chambers 210), such embodiment employs a communal collection trough 252 for collecting contaminant or separated phase from each chamber 210, and such communal collection trough 252 is in fluid communication with each skim oil trough 242 for each chamber 210.

A further distinguishing feature of the tank 10 is that the interconnecting passage 205 collects fluid at an inlet region situated generally unaligned with the rotational flow direction of the fluid as fluid enters at the bottom of the chamber opposite the sloped weir 230. To prevent fluid from entering from the upper region and passing directly behind the divider plate 290 in its rotational flow pattern, a deflector plate 330 is used to partially block the opening at the top of the divider plate 290. This increases the residence time of the fluid in each chamber 210 and increases the effectiveness of gas introduced into the chamber for adhering to the contaminants and bringing the contaminants to the surface for removal over the skim oil weir 250. Similarly to the tank 10 shown in FIG. 1A to FIG. 5B, a gas inlet 280 is positioned in the interconnecting passage 205 for injecting a gas, such as air or nitrogen, into the interconnecting passage 205 for mixing with the fluid as it passes through the interconnecting passage 205. As outlined above, a greater control of the flow of the gas is achieved by introducing the gas in the interconnecting passage 205 as the volume of fluid is reduced in the interconnecting passage 205 as compared to the chamber 210. By introducing the gas in the interconnecting passage 205, the gas has a greater tendency to follow a similar flow pattern as the fluid once it is introduced into the adjacent chamber and therefore the effectiveness of the gas to adhere to the contaminants in the fluid is increased.

During operation, fluid is input into the first chamber at fluid input 270 into an upper area of the chamber 100 and is output from a lower region of the final chamber 100 of the tank 10 at an outlet 260.

Figure 10:
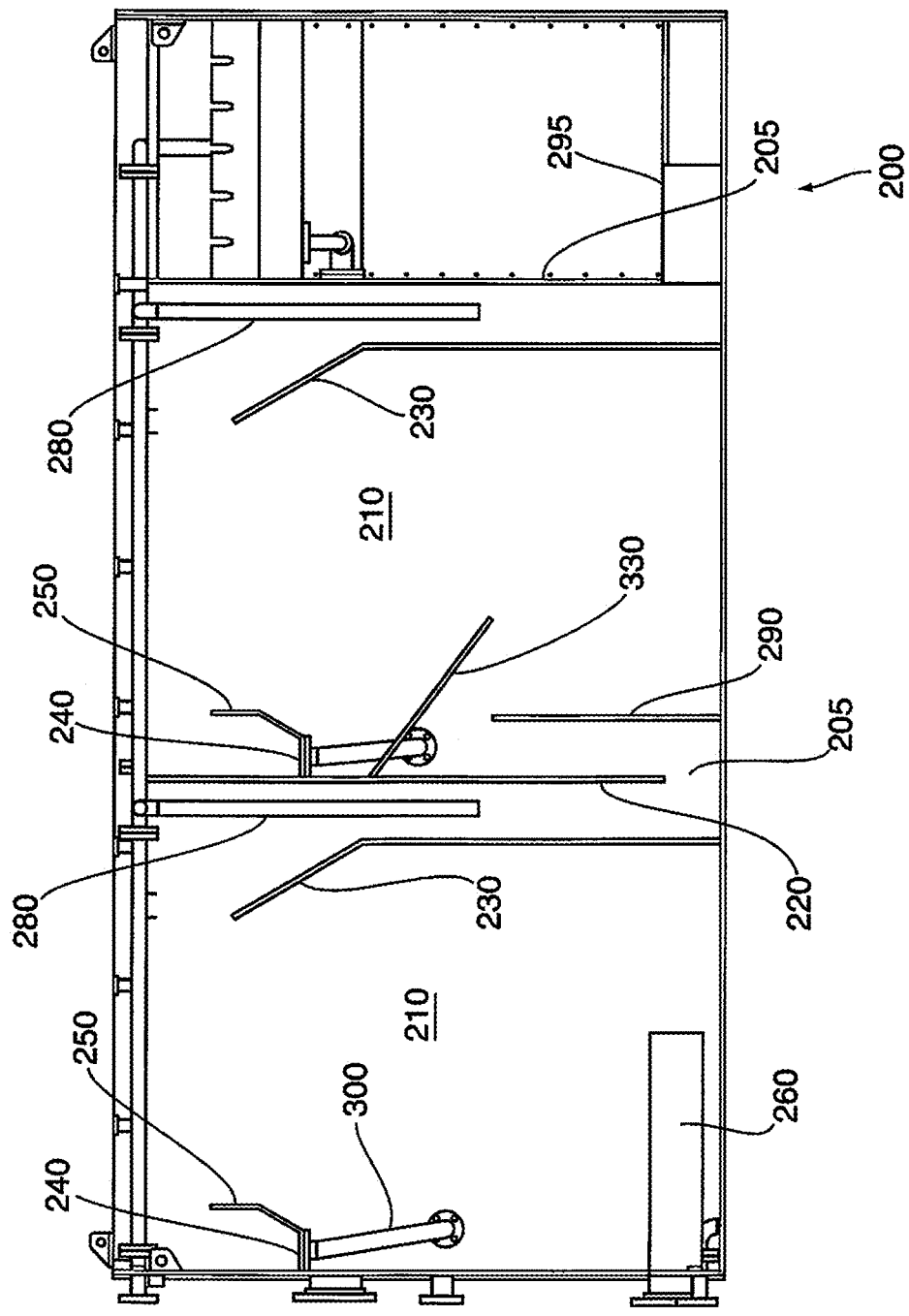
FIG. 10 is a schematic illustrative of a right side of the embodiment of a secondary phase separation tank shown in FIG. 6 wherein the exterior wall has been removed to allow viewing of the internal chambers.

As shown in FIG. 10, each interconnecting passage 205 has a gas inlet 280 for injecting gas into each of the interconnecting passages 205. Gas may be injected into the first chamber in the input 270 or adjacent thereto.

As fluid passes from chamber to adjacent chamber, contaminants rise to the surface and are removed over the skim oil weir 250. Fluid towards the bottom of each chamber 210 has a lower concentration of contaminants that fluid towards the top of the each chamber 210. As the interconnecting passage 205 draws fluid from towards the bottom of the chamber 210, fluid passing from the chamber to the adjacent chamber has a lower concentration of contaminants than the chamber from which it came. In this manner, the fluid is gradually decontaminated as it passes from chamber to adjacent chamber through the interconnecting passages 205 wherein gas is injected and adheres to contaminants in the fluid. Fluid passes through the chambers 210 on the front side of the tank and then passes into the back chamber, shown as the third chamber in the sequence of chambers, where the fluid then comes back toward the front of tank and passes through the remaining chambers.

Figure 12:
FIGS. 12 and 13 are flow diagrams showing fluid flow through the secondary phase separation tank shown in FIG. 6 and FIG. 11.
Figure 13:
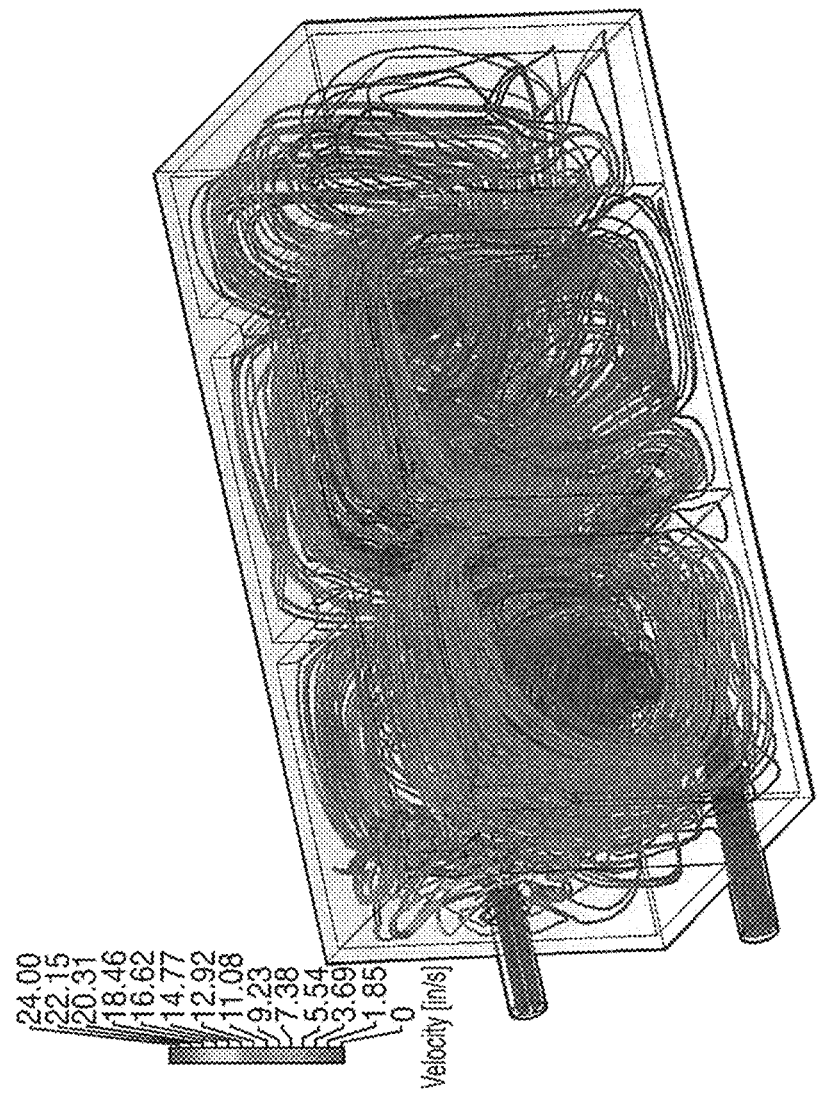

The back chamber is shown more clearly in FIGS. 8-11 where it may be seen that because the fluid changes direction back toward the front of the tank 200, the interconnecting passage 205 does not include a dividing plate 290 but rather the fluid flows under a false floor 295 and under the partition separating the back chamber from the adjacent chamber where gas is then injected in the interconnecting passage 205. Further, the back chamber does not include a deflector 330 as it is unnecessary in view of the orientation and inlet shape and position of the interconnecting passage 205. The fluid flow pattern through the tank 200 including the back chamber is shown in FIGS. 11 & 12.

It will be appreciated that although the tank 200 is shown as having five chambers 210 (best seen in FIGS. 6-8), the tank 200 may include fewer or more chambers 210 as desired or required.

In an alternative embodiment to that shown in FIGS. 6-10, and as shown in FIG. 11 (FIG. 11 being a schematic illustrative of a right side of the embodiment of a secondary phase separation tank shown in FIG. 6 wherein the exterior wall has been removed to allow viewing of the internal chambers) a communal skim oil trough 252 may be used and positioned in the center of the tank 10 to collect contaminant from skim oil troughs 242 for associated adjacent chambers 100. The chamber 100 at the back end of the tank 200, represented as the third chamber in the embodiment shown, still generally requires its own dedicated skim oil trough 242.

Figure 14:
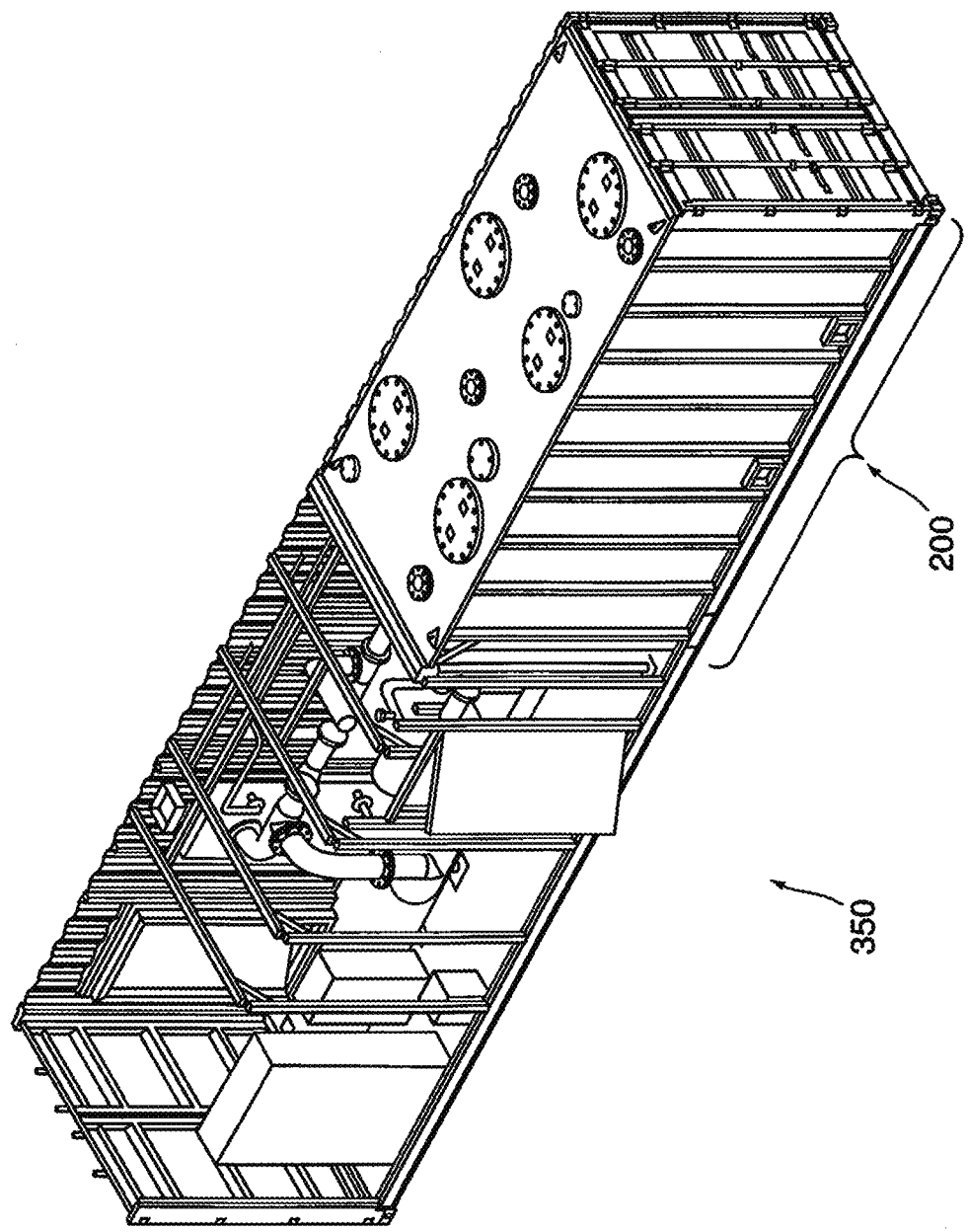
FIGS. 14 and 15 are schematics illustrative of a secondary phase separation tank such as that shown in FIG. 6 and FIG. 11 located within a portable sea container.
Figure 15:
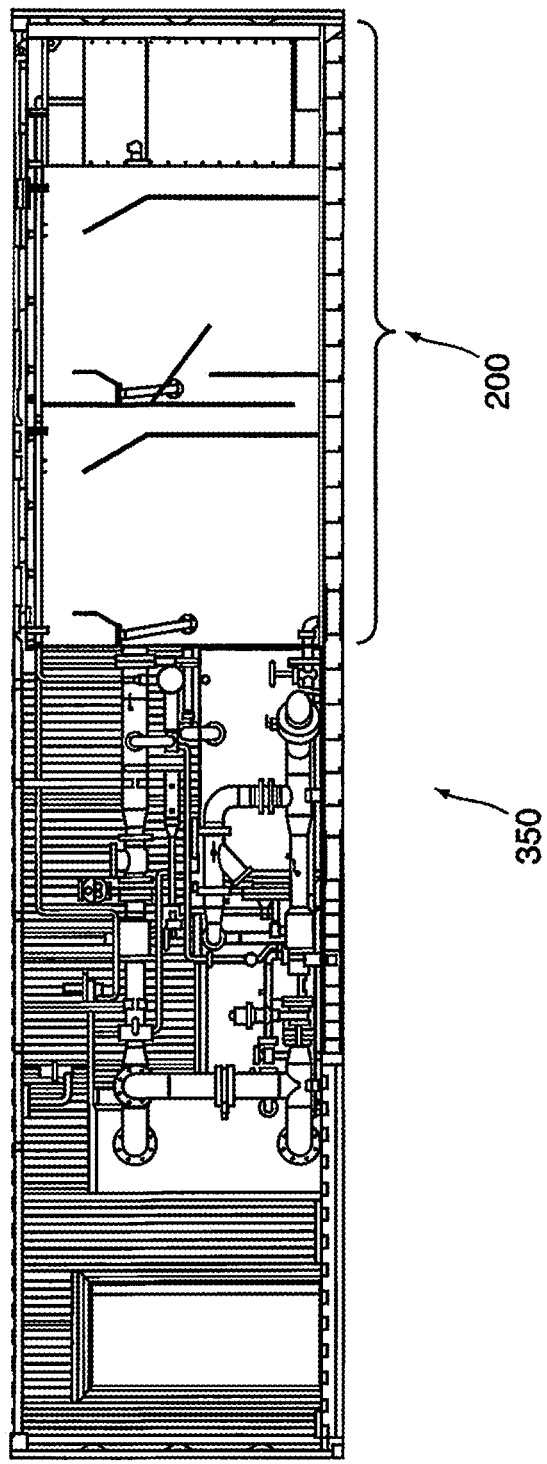

As with the tank 10 outlined above with reference to Example 1, the tank 200 may also be placed in a portable shipping container 350 as shown in FIGS. 14 and 15 for facilitating transport of the tank 200. As shown in FIGS. 14 and 15, the associated pumps, piping and ancillary components of the tank necessary for input and outputting fluid, inputting gas, for example may also be captured within the portable shipping container.

It will be appreciated that although the term "decontaminated" is used herein, usage of this term should reflect a reduction in the concentration or amount of contaminates in the fluid from when fluid is input as compared to when fluid is output from the tank and should not be construed to indicate that all contaminants are removed. Trace amounts or even small amount of contaminant may remain in the fluid. Contaminant reduction may be based on residence time, the number of chambers in the tank, the flow rate, etc.

Further, although the sloped weirs 90, 230 of the tanks 10 are shown to be generally positioned in a similar location in each chamber 100, 210 respectively of the tanks 10, the sloped weirs 90, 230 thereof may be positioned at various depths and/or orientations within each chamber.

FIG. 16 and the cross-sectional view shown in FIG. 17 taken along plane 'R'-'R' of FIG. 16, depicts embodiment of the tank 10 of the present invention having:

a first plurality of interconnected chambers 210a, 210'a, and 210"a;

a second plurality of interconnected chambers 210b, 210'b, and 210"b;

a third plurality of interconnected chambers 210c, 210'c, and 210"c;

a fourth plurality of interconnected chambers 210d, 210'd, and 210"d;

a fifth plurality of interconnected chambers 210e, 210'e, and 210"e; and a sixth plurality of interconnected chambers 210f, 210'f, and 210"f;

each of the three members of a respective plurality of interconnected chambers arranged in mutual end-to-end configuration. Each 3-member plurality of interconnected chambers is further arranged in mutual side-by-side relation to an adjoining set of interconnected chambers.

In such manner, pluralities of successive chambers 210, 210', and 210" (in this case, three), may successively treat a plurality of inlet streams a, b, c, d, e & f which enter such tank 10 via respective inlet ports 270a-f on inlet manifold 'IM'.

Cleaned flow, having at least one phase separated therefrom, exits tank 10 via respective exit ports 260a-f which flow into common exit manifold 'EM'. A common trough 277 may be provided along a side of tank 10, to collect e separated secondary phase communally collected from each of skimming troughs 240a-f, 240"a-f, and 240"a-f.

FIG. 17 shows a cross section along plane 'R'-'R' of FIG. 16, and in particular a longitudinal cross-section through the second plurality of interconnected chambers 210b, 201"b, and 210"b. Shields 290b, 290'b, and 290"b, as well as 330b, 330'b, and 330"b, are provided at the respective location of the interconnecting passages 205, 205' as well as at the exit port 260b, to ensure fluid flow to each respective interconnecting passages 205, 205' and exit port 260b is not in a direction of the rotational flow imparted in respective chambers 210b, 210'b, and 210"b, to reduce "short circuiting" of flow as discussed earlier herein.

FIG. 18 shows a modified separation tank 1000 of the present invention, which may comprise the single chamber 210 shown in FIG. 18, or a series of such chambers 210 in fluid communication (successively interconnected) for successive treatment of a fluid. A filter means, in the form of a non-fixed media such as pelletized granules, or black walnut shells 370, is provided in the lower region of chamber 210. Inclined weir 230 imparts a rotational direction to fluid being treated, in the direction of the arrow shown. Treated water, having a secondary phase skimmed therefrom by weir 240, is withdrawn through filter means 370, and then removed from exit port 260 and potentially provided to another similar modified tank 1000 for subsequent further treatment of such fluid.

Lastly, FIG. 19 shows a similar separation tank 1000 having filter means in the bottom of chamber 201. Filter means 370 in the form of a non-fixed media such as pelletized granules, or black walnut shells 370. In the embodiment shown, a plurality of radial nozzles 372 receive a purging fluid via pressurized line 374, useful during a backwash cycle for such separation tank, to re-fluidize contaminants which may have plugged the filter means 370 to thereby subject same to further skimming to remove such impurities during a backwash cycle of the tank 1000. After cessation of the backwash cycle and the supply of a purging fluid to radial nozzles 372, the earlier process of imparting a rotational flow when introducing fluid into chamber 210 via inclined weir 230 may be recommenced to continue the treatment process.

Although not shown in the Figures, it will be appreciated that additional plumbing, piping, pumps, and operations accessories may be needed to operate the tanks disclosed herein which are traditionally used and would be known. These additional components are contemplated and their use and incorporation are within the scope of the invention. Further medications and amendments obvious to a skilled technician may be made to the tanks disclosed herein and such modifications and amendments are within the scope and spirit of the invention disclosed.

What is claimed is:

1. A phase separation tank for removing a contaminant from a fluid or separating a phase from a multi-phase fluid which is input into the tank, said tank comprising:

a floor defining a bottom of the tank and depending walls defining sides of the tank;

a plurality of interconnected adjacent chambers within said tank for successively treating said fluid;

an inlet in fluid communication with a first chamber of the plurality of adjacent chambers, for inputting a fluid comprising a contaminant or a plurality of phases to said first chamber; and an outlet in fluid communication with a last chamber of said plurality of adjacent chambers, for outputting fluid with reduced contaminant or substantially comprising only a single phase, the outlet positioned proximate a bottom of said last chamber of the plurality of adjacent chambers;

a sloped weir within an upper region each of said adjacent chambers for inducing a rotational flow of said fluid within each of said chambers, the sloped weir in said first chamber inclined to said inlet and a direction of said fluid flowing into said first chamber via said inlet so that said fluid flowing into said first chamber impacts the sloped weir of said first chamber;
a skim oil trough in association with a plurality of said interconnected adjacent chambers and non-centrally located in said separation tank and separated from an interior of said plurality of adjacent chambers by a skimming weir, the skimming weir situated in an upper region of each of said adjacent chambers substantially opposite a location of the sloped weir in said plurality of chambers, said rotational flow of said fluid being along an upper surface of said chamber causing movement of said fluid from said sloped weir towards said skim oil trough; and
an interconnecting passage, comprising an aperture in a lower region of a dividing wall dividing at least one of said chambers from an adjacent chamber, allowing fluid flow from substantially a bottom of said at least one chamber to a lower region in said adjacent chamber and thereafter upwards in said adjacent chamber towards the sloped weir in said upper region of said adjacent chamber, said interconnecting passage positioned within said at least one chamber such that fluid flow from said at least one chamber to said interconnecting passage is not in a direction of the rotational flow of said fluid in said at least one chamber.

2. The phase separation tank of claim 1, wherein the interconnecting passage is adapted to output fluid from the at least one chamber in a direction of an upper region of an adjacent chamber.

3. The phase separation tank of claim 1, further comprising a gas inlet in communication with the interconnecting passage of the at least one chamber for introducing a gas into the fluid being transferred from said at least one chamber to the adjacent chamber via the interconnecting passage.

4. The phase separation tank of claim 3, wherein the interconnecting passage is narrower in cross-section than the chambers, to provide for a higher gas to fluid ratio in the interconnecting chamber than if said gas was introduced directly into one of said plurality of adjacent chambers.

5. The phase separation tank of claim 1, wherein an inlet end of the interconnecting passage is positioned substantially below the sloped weir of the one chamber proximate a bottom of each of said plurality of adjacent chambers.

6. The phase separation tank of claim 1, further comprising a shield for partially blocking an inlet end of the interconnecting passage.

7. The phase separation tank of claim 1, wherein an inlet end of the interconnecting passage between said at least one chamber and an adjacent chamber is located in said at least one chamber on a wall thereof, said wall having proximate an opposite side thereof said sloped weir contained in a successive adjacent chamber, further having a shield proximate said fluid inlet to ensure fluid flow to said interconnecting passage is not in a direction of the rotational flow imparted in the at least one chamber.

8. The phase separation tank of claim 1, wherein each chamber has a skim oil trough physically contained within the chamber.

9. The phase separation tank of claim 1, wherein the skim oil trough is a communal skim oil trough in communication with multiple or all of the chambers.

10. The phase separation tank of claim 1, wherein the tank is contained within a shipping container.

11. The phase separation tank of claim 1, wherein said plurality of interconnected chambers are arranged in mutual side-by-side juxtaposed configuration, and wherein an inlet end of the interconnecting passage is positioned substantially below the sloped weir of the one chamber proximate a bottom of each of said plurality of adjacent chambers.

12. The phase separation tank of claim 1, wherein said plurality of interconnected chambers are arranged in mutual end-to-end configuration, further comprising a shield positioned below said skimming weir in said plurality of chambers for partially blocking an inlet end of the interconnecting passage, with said interconnecting passage situated at a location below said shield and permitting fluid flow from substantially a bottom of at least one chamber at said location to an upper region of an adjacent chamber and towards the sloped weir in said adjacent chamber.

13. The phase separation tank of claim 1, wherein:
wherein said plurality of interconnected adjacent chambers are arranged in mutual end-to-end configuration; and
wherein said plurality of interconnected adjacent chambers are further arranged in mutual side-by-side juxtaposed configuration.

14. The phase separation tank of claim 1, further comprising, in a lower region of at least one of said chambers, a filter media.

15. The phase separation tank of claim 14, wherein said filter media is a non-fixed granular media.

16. The phase separation tank of claim 1, wherein the phase separation tank is rectangular.

17. The phase separation tank of claim 1, further comprising a partition between the first and second chambers, interconnecting passage defined by a gap between the partition and the floor.

18. A separation tank for removing a contaminant from a fluid or separating a phase from a multi-phase fluid which is input into the tank, the separation tank comprising:
a floor and plurality of depending walls defining a rectangular shape;
a plurality of interconnected adjacent chambers within the tank for successively treating the fluid, the plurality of interconnected adjacent chambers including at least a first chamber and an adjacent second chamber;
an inlet in fluid communication with the first chamber for inputting the fluid into the first chamber;
first and second sloped weirs within an upper region of the first and second chambers, respectively, the first and second weirs for inducing a rotational flow of the fluid within a respective one of the first and second chambers, the first sloped weir inclined to the inlet and to a direction of the fluid flowing into the first chamber via the inlet so that the fluid flowing into the first chamber impacts the first sloped weir;
first and second skim oil troughs disposed in the first and second chambers, respectively, the first and second skim oil troughs non-centrally located in the separation tank, the first and second skim oil troughs separated from an interior of the respective first and second chambers by first and second skimming weirs, respectively, the first and second skimming weirs situated in an upper region of each of the first and second chambers, respectively, substantially opposite the respective first and second sloped weir, rotational flow of fluid being along an upper surface of the first and second chambers causing movement of the fluid from the first and second sloped weirs towards the first and second skim oil troughs, respectively;
a partition between the first and second chambers; and
an interconnecting passage defined by a gap between the partition and the floor, the interconnection passage allowing fluid flow from substantially a bottom of the first chamber to a lower region in the second chamber and thereafter upwards in the second chamber towards the second sloped weir, the interconnecting passage positioned within the first chamber such that fluid flow from the first chamber to the interconnecting passage is not in a direction of the rotational flow of the fluid in the first chamber.

* * * * *